United States Patent [19]

Coury

[11] 4,318,729

[45] Mar. 9, 1982

[54] STABLE LIQUID N-P-K FERTILIZER COMPOSITION AND METHOD OF USE

[75] Inventor: Robert M. Coury, Westerville, Ohio

[73] Assignee: Chem-Lawn Corporation, Columbus, Ohio

[21] Appl. No.: 110,975

[22] Filed: Jan. 10, 1980

[51] Int. Cl.$^3$ .............................................. C05C 9/02
[52] U.S. Cl. .................... 71/29; 71/64.10; 564/32; 564/59
[58] Field of Search .............. 71/1, 28, 29, 34, 49, 71/51, 61, 64 C, 64.8, 64.10; 260/555 R, 555 C; 564/59, 32

[56] References Cited

U.S. PATENT DOCUMENTS

| | | | |
|---|---|---|---|
| 2,869,996 | 1/1959 | Vierling | 71/29 |
| 3,096,168 | 7/1963 | Waters et al. | 71/28 |
| 3,462,256 | 8/1969 | Justice et al. | 71/28 |
| 3,677,736 | 7/1972 | Formaini | 71/28 |
| 4,033,745 | 7/1977 | Moore | 71/28 |
| 4,173,582 | 11/1979 | Greidinger et al. | 71/28 X |

FOREIGN PATENT DOCUMENTS

875907  8/1961  United Kingdom ................... 71/28

*Primary Examiner*—Kenneth M. Schor
*Assistant Examiner*—Ferris H. Lander
*Attorney, Agent, or Firm*—Biebel, French & Nauman

[57] ABSTRACT

A liquid fertilizer composition which is storable for 6–8 months is prepared from an aqueous methylol urea containing solution and dibasic potassium phosphate. The methylol urea containing solution has a nitrogen content of approximately 15–35% by weight. The dibasic potassium phosphate adds the phosphorous and potassium components to form a complete fertilizer having a preferred N-P-K ratio of from about 6:1:1.33 to 18:1:1. It also stabilizes the methylol urea containing solution so that premature gelling and precipitation are avoided. As such, the liquid fertilizer is storable and easily applied through liquid application to a lawn.

6 Claims, No Drawings

STABLE LIQUID N-P-K FERTILIZER COMPOSITION AND METHOD OF USE

BACKGROUND OF THE INVENTION

This invention relates to a stabilized, storable liquid lawn fertilizer. More particularly, it relates to a nitrogen-phosphorous-potassium (N-P-K) fertilizer comprising a methylol urea containing solution and dibasic potassium phosphate, $K_2HPO_4$, and the method of using such a fertilizer.

Urea formaldehyde polymers have been used for many years in the preparation of fertilizers. In fact, they find utility in all physical types of fertilizers—solid, suspended solids, and liquid.

Ureaform is a generic name for fertilizer grade urea formaldehyde condensates which were developed to provide controlled release of nitrogen to growing plants. This slow release of nitrogen gives a reduced tendency to burn, as is well known. At first, ureaform fertilizers were solid ones. Numerous patents have issued to various methods for preparing solids ureaform and solid ureaform fertilizer mixtures, including ones in which some form of potassium phosphate is utilized. See, for example, Greidinger, U.S. Pat. No. 4,089,899; Murphy, U.S. Pat. No. 3,479,175; and O'Donnell, U.S. Pat. No. 2,830,036.

Griedinger relates to a solid ureaform compound having a low average degree of polymerization between urea and formaldehyde. It is disclosed that this is accomplished by preparation of the ureaform in a controlled solution medium such as $H_3PO_4-KH_2PO_4$ and $H_3PO_4-NH_4H_2PO_4$. Murphy discloses producing a solid fertilizer having a relatively high nitrogen, phosphorous, and potassium content and which is in the form of dry readily spreadable granules or pellets of uniform composition. Thus, in addition to the urea-formaldehyde resin, the mixture of Murphy contains at least one phosphorous-containing compound selected from the group consisting of monoammonium phosphate, diammonium phosphate, monocalcium phosphate, potassium phosphate and phosphoric acid, and at least one potassium-containing compound selected from the group consisting of potassium chloride, potassium sulfate, potassium nitrate, and potassium phosphate. Finally, O'Donnell produces a solid ureaform fertilizer using a buffer solution which may be a mixture of monopotassium phosphate and dipotassium phosphate.

Still, there are a number of advantages to application of liquid fertilizers. For this reason, some have used an aqueous suspension of solid urea-form fertilizers. One in particular has suggested addition of monopotassium phosphate to a solid fertilizer which may be suspended in this manner.

Thus, Funk in U.S. Pat. Nos. 4,036,627 and 4,089,670 discloses a dry homogeneous blend that may be carried in liquid for application to surface or subsurface areas by conventional liquid fertilizer applying equipment. His mixture is of a low bulk density provided ureaform having soluble and insoluble components combined with soluble monopotassium phosphate. The mixture may be shipped and stored as dry materials and later mixed with water for use.

For the most part, this is an unsatisfactory means to obtain the stability and shipping advantages of a dry material and the application advantages of a liquid one. The suspension is not stable and, therefore, each application amount must be mixed at the time of use. Likewise, mixing equipment may be required to keep the solids uniformly suspended and prevent clogging of hydraulic equipment. Even then, granular or pellet sized particles which will not dissolve in water will not pass through the openings in conventional injection equipment. Care must be taken, as in Funk, to make absolutely sure that the blend of powdered synthetic organic fertilizer material is of a size to pass at least a 60-mesh sieve.

Accordingly, it would be more desirable to use a liquid urea-formaldehyde based fertilizer if certain stability problems could be overcome. Of course, liquid urea-formaldehyde fertilizers in themselves are well known. Waters in U.S. Pat. No. 3,096,168 prepared suspensions of ureaform in liquid mixed fertilizers. These suspensions of urea-formaldehyde resin in water were prepared by reacting 1 to 2.5 moles of urea per mole of formaldehyde under acid conditions. The acid medium is preferably phosphoric acid, to which may be added a potassium compound such as potassium chloride. Later in the process, the phosphoric acid is neutralized with ammonia to form an ammonium phosphate. An improvement on the Waters patent was taken out by Formani in U.S. Pat. No. 3,677,746. The improved process was said to produce a liquid fertilizer suspension containing ureaform having a water insoluble nitrogen content of at least 1.5% and an activity index in excess of 60.

However, as noted in Moore U.S. Pat. No. 4,033,745, neither of the fluid products of Waters and Formani may be stored for commercially required periods of times. Moore attributes this to the fact that the urea-formaldehyde polymers continue to grow in molecular weight and within several days, the fluid fertilizer turns into a semi-solid which cannot be handled in pipes, pumps, nozzles and tanks. Finally, Moore notes that the use of highly diluted products to prevent gelling and solids formation, results in the urea-formaldehyde polymers settling rapidly to the bottom of the storage or distribution tanks.

Moore's solution to this problem is to add alcohol and sugar additives in an effort to stabilize the polymers for storage. It is stated that the alcohol inhibits the growth, gelling, and precipitation of the neutral urea formaldehyde polymers in the fertilizer. The carbonyl groups of the sugars are believed by Moore to react with the urea-formaldehyde polymer, causing thickening and gell formation which stabilizes the suspension and inhibits layer separation and precipitation. The result is a composition stable and storable for 60 or so days.

While this is certainly an improvement on the one-day storability of Waters and Formani, it is still by far too short a period of time in many instances. Obviously, if the liquid fertilizer is to be bottled and sold over the counter, if must be storable for longer than 60 days. Even the large lawn care companies need at least season-long storage capabilities.

Accordingly, the need exists for a stable liquid area formaldehyde type fertilizer which is storable for at least 6-8 months.

SUMMARY OF THE INVENTION

The present invention meets the need by providing a stable liquid fertilizer of the N-P-K type. Basically, that fertilizer is an aqueous mixture of a liquid urea-formaldehyde component and dibasic potassium phosphate ($K_2HPO_4$).

Preferably, the urea-formaldehyde component is a true liquid (as distinguished from an aqueous suspension of insoluble and soluble urea-formaldehyde resins). These relatively new forms of urea-formaldehyde fertilizers generally contain 25-65% urea, about 30-60% methylol urea and methylol urea ethers, and less than about 15% methylene diurea and dimethylene triurea, all percentages by weight. These fertilizers are generally known as high urea formaldehyde (HUF) or methylol urea-nitrogen (MO-N) fertilizers. The overall nitrogen concentration in the methylol urea containing solution is about 15-35% by weight and the solution contains substantially no water insoluble nitrogen compounds, but small amounts of solids may be present in suspension.

However, it is also a part of the present invention to stabilize liquid ureaform fertilizers of the type which do contain a combination of long chain water insoluble methylene ureas and shortchain water-soluble methylol ureas. Such liquid fertilizers are of the type disclosed in Waters U.S. Pat. No. 3,096,168 and Formani U.S. Pat. No. 3,677,736. The stabilizing agent is in a all cases dibasic potassium phosphate.

Dibasic potassium phosphate has the emperical formula $K_2HPO_4$. It is completely water soluble. Surprisingly, it is not only sufficient to provide the phosphorous (P) and potassium (K) components to give a complete N-P-K fertilizer, but it also stabilizes the methylol urea containing fertilizer. The resultant complete liquid fertilizer preferably has an N-P-K ratio of from about 6:1:1.33 to 18:1:1. The slow-release characteristics depend on the amount of suspended water-soluble methylene urea polymers present. However, even the completely liquid, high methylol urea content solutions of the preferred embodiment offer a controlled nitrogen release which is sufficient for most purposes.

The combination of a methylol urea containing solution and dibasic potassium phosphate is stable and may be stored for 6-8 months without significant gelling or precipitation. It does not require large amounts of agitation prior to application through normal liquid applicators or liquid injection nozzles. The preferred use is a turf builder by spraying on the lawn in the usual manner of liquid fertilizer application.

Accordingly, it is an object of the present invention to provide a storable N-P-K liquid fertilizer composition having improved stability.

Another object of the present invention is to use a liquid fertilizer having a methylol urea containing solution component and a dibasic potassium phosphate component for application to lawns and turf.

Other objects and advantages of the invention will be apparent from the following description and the appended claims.

DESCRIPTION OF THE PREFERRED EMBODIMENTS

As mentioned, the stable liquid N-P-K fertilizer of the present invention is the mixture of two major components. As the methylol urea containing solution, the preferred material is an aqueous solution of a completely water soluble reaction product of urea and formaldehyde. This product is available from both the Ashland Chemical Corp. under the trademark Formalene 25 and from the Georgia Pacific Company. It is produced by a process substantially similar to that disclosed in Justice U.S. Pat. No. 3,462,256.

The preferred methylol urea containing solution comprises about 15-35% by weight total nitrogen in the form of about 25-60% urea, about 30-60% methylol urea and methylol urea ethers, and less than about 15% methylene diurea and dimethylene triurea, respectively by weight. This material contains substantially no water insoluble nitrogen compounds. It is maintained at a pH of from about 9 to 12.

Because a substantial portion of the total available nitrogen is present as methylol ureas or methylene ureas, the foliage burn potential of the fertilizer is reduced. Of course, the extremely long slow release characteristics of these types of solutions depend on the presence of insoluble methylene urea polymers which are absent from the preferred embodiment. Still, the slow release characteristics of the preferred methylol urea containing solution is sufficient for most purposes. In addition, Justice in U.S. Pat. No. 3,462,256 teaches how to adjust the formulation so that additional slow release properties may be obtained. And, since such solution, as well as those of Waters (U.S. Pat. No. 3,096,168) and Formani (U.S. Pat. No. 3,677,736), can be stabilized in the same manner as the preferred ones, it is an alternative embodiment of the present invention to do so.

The stabilizing component, and the one which adds the potassium and phosphorous portions of the complete fertilizer, is dibasic potassium phosphate. Having the emperical formula $K_2HPO_4$, it is known as potassium hydrogen phosphate, potassium monophosphate, dipotassium orthophosphate and dipotassium phosphate. Dibasic potassium phosphate is available from many sources in the form of deliquescent white crystals or powder. Prepared by the action of phosphoric acid on potassium, it is highly soluble in water.

The preferred embodiment of the present invention is simply to mix dibasic potassium phosphate crystals or powder into an aqueous methylol urea containing solution of the type described above. The amount added is that sufficient to give the desired N-P-K ratio and may be determined on a molecular weight basis. Additional water may be added to adjust the concentrations of the fertilizer also to obtain the sought-for N-P-K ratio. Generally, the preferred N-P-K ratio is from about 6:1:1.33 to 18:1:1.

The resultant complete fertilizer is typically applied to turf at the rate of 0.25 to 2.5 pounds of nitrogen per 1,000 ft$^2$, and preferably at a rate of about 1.0 pounds per 1,000 ft$^2$. The composition may be stored in tanks and applied by mechanical sprayers of designs well known in the art. It will not plug the holes of such applicators since there are no suspended solids in solution and since precipitates are not formed with the stabilized liquid fertilizer compositions of the present invention.

In terms of that stability, it will remain liquid and sprayable for a period of 6-8 months. This enables storage of the liquid fertilizer on the shelf in readiness for a season's application. The only precaution in terms of manner of storage is that freezing of the liquid fertilizer should be avoided.

The following is an example of the preparation of a liquid fertilizer having these advantageous features.

EXAMPLE

A complete fertilizer having an N-P-K ratio of 18:3:3.97 was prepared by weighing 300 grams of an aqueous methylol urea containing solution and adding 36.85 grams of dibasic potassium phosphate powder with stirring. This was followed by the addition of 163.1 grams of water, also with stirring.

The methylol urea containing solution was a commercial one purchased from Georgia Pacific. It had a 30% by weight total nitrogen content. The dibasic potassium phosphate was a commercial grade powder.

A liquid fertilizer prepared in this manner was bottled and allowed to set on the laboratory shelf for over six months without any sign of gelling or precipitation. In addition, other liquid fertilizers with N-P-K ratios from 6:1:1.33 to 18:1:1 have been prepared in a similar manner. These liquid fertilizers were compared with ones prepared using the same methylol urea containing solution, but a different source of potassium and phosphorous. That is, such materials as phosphoric acid and ammonium phosphate were used for the phosphorous component and potassium chloride was used as the potassium component. Use of dibasic potassium phosphate as in the present invention gave a stability which was considerably improved over the other combinations of methylol urea containing solutions and common P & K sources.

While the compositions and methods described herein constitute preferred embodiments of the invention, it is to be understood that the invention is not limited to these precise compositions and methods, and that changes may be made in either without departing from the scope of the invention, which is defined in the appended claims.

What is claimed is:

1. A storable N-P-K liquid fertilizer composition having improved stability and an N-P-K ratio of from about 18:3:3.97 to 18:1:1, consisting essentially of a mixture of a methylol urea containing solution having a nitrogen content of approximately 15–35%, dibasic potassium phosphate, and water.

2. The liquid fertilizer composition of claim 1 wherein said methylol urea containing solution contains from about 25–60% urea, from about 30–60% methylol urea and methylol urea ethers, and less than about 15% methylene diurea and dimethylene triurea.

3. The liquid fertilizers composition of claim 2 wherein said N-P-K ratio is 18:3:3.97.

4. The liquid fertilizer composition of claim 3 wherein the nitrogen content of said methylol urea containing solution is approximately 30%.

5. A method of stimulating turf growth comprising applying the composition of claim 1 to a lawn surface.

6. The method of claim 5 wherein said liquid fertilizer is applied at the rate of from about 0.25 to 2.5 pounds of nitrogen per 1,000 ft$^2$ of lawn surface.

* * * * *